(12) United States Patent
Aoki

(10) Patent No.: US 12,531,085 B2
(45) Date of Patent: Jan. 20, 2026

(54) DISK DEVICE

(71) Applicants: Kabushiki Kaisha Toshiba, Tokyo (JP); Toshiba Electronic Devices & Storage Corporation, Tokyo (JP)

(72) Inventor: Kenichiro Aoki, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/625,413

(22) Filed: Apr. 3, 2024

(65) Prior Publication Data

US 2025/0174248 A1 May 29, 2025

(30) Foreign Application Priority Data

Nov. 27, 2023 (JP) .................................. 2023-199960

(51) Int. Cl.
*G11B 5/54* (2006.01)
*G11B 5/48* (2006.01)
*G11B 5/60* (2006.01)

(52) U.S. Cl.
CPC ............ *G11B 5/4873* (2013.01); *G11B 5/607* (2013.01)

(58) Field of Classification Search
CPC .. G11B 5/00; G11B 5/09; G11B 20/18; G11B 5/6007; G11B 5/6005; G11B 27/36; G11B 2005/0021; G11B 5/54; G11B 5/58

USPC .......................................................... 360/75
See application file for complete search history.

(56) References Cited

U.S. PATENT DOCUMENTS

| | | | |
|---|---|---|---|
| 6,950,287 B2 | 9/2005 | Nakamura et al. | |
| 7,974,039 B1* | 7/2011 | Xu ........................ | G11B 5/6005 360/75 |
| 9,053,730 B1* | 6/2015 | Hogg ................... | G11B 5/6076 |
| 9,142,225 B1 | 9/2015 | Chen et al. | |
| 10,014,027 B2 | 7/2018 | Kumar et al. | |
| 2003/0202293 A1 | 10/2003 | Nakamura et al. | |
| 2018/0130493 A1 | 5/2018 | Kumar et al. | |
| 2022/0399036 A1 | 12/2022 | Koizumi | |

FOREIGN PATENT DOCUMENTS

JP 2022-190907 A 12/2022

* cited by examiner

*Primary Examiner* — Nabil Z Hindi
(74) *Attorney, Agent, or Firm* — Kim & Stewart LLP

(57) ABSTRACT

According to one embodiment, a disk device includes a disk-shaped recording medium, a magnetic head including a write head, a read head, and a heater configured to adjust a gap between the magnetic head and the recording medium, a suspension assembly supporting the magnetic head, a micro actuator including a piezoelectric element on the suspension assembly, and a controller configured to set a drive voltage of the piezoelectric element in accordance with a difference between a touchdown output in time of driving the piezoelectric element and a touchdown output in time of non-driving the piezoelectric element.

7 Claims, 9 Drawing Sheets

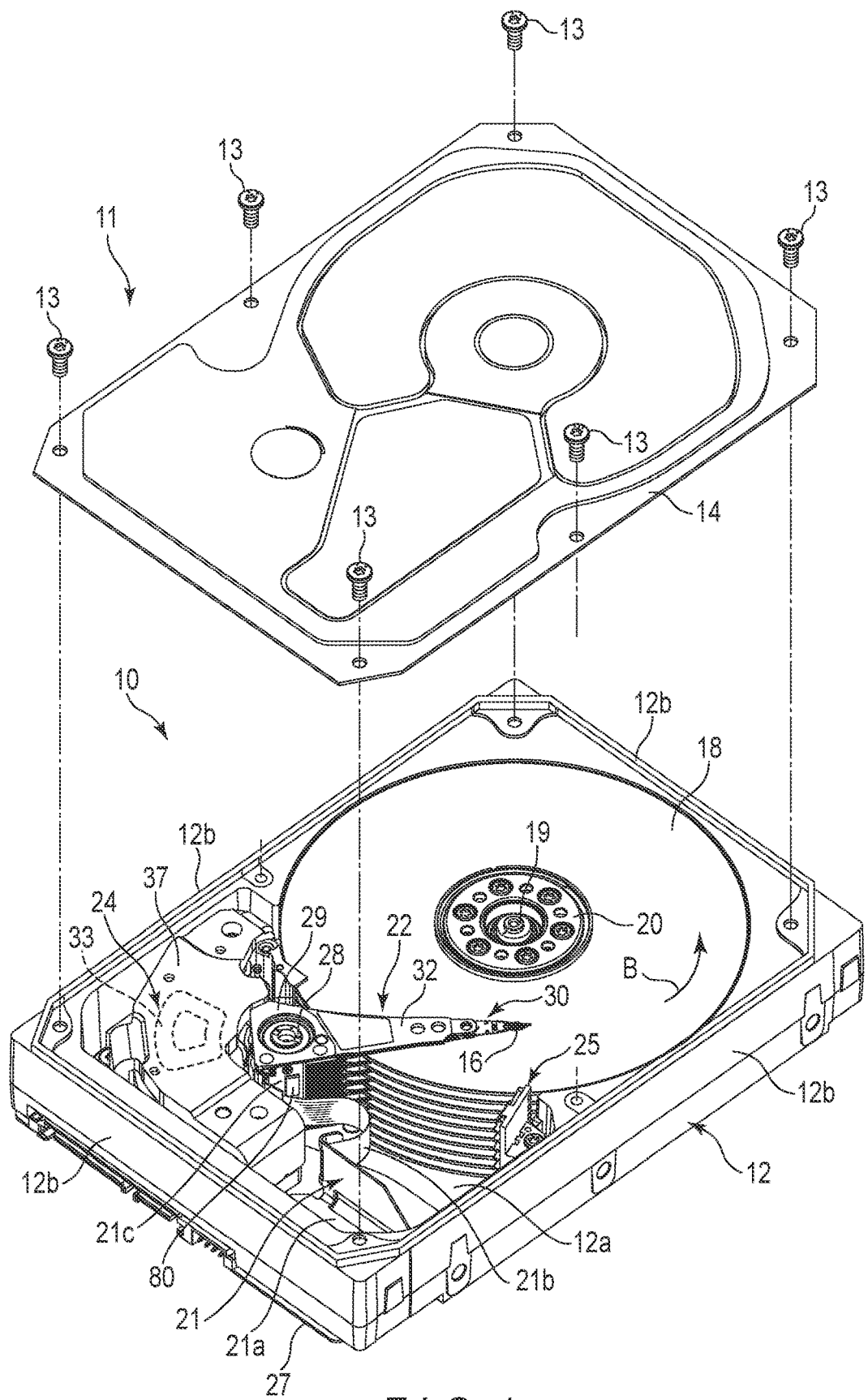
F I G. 1

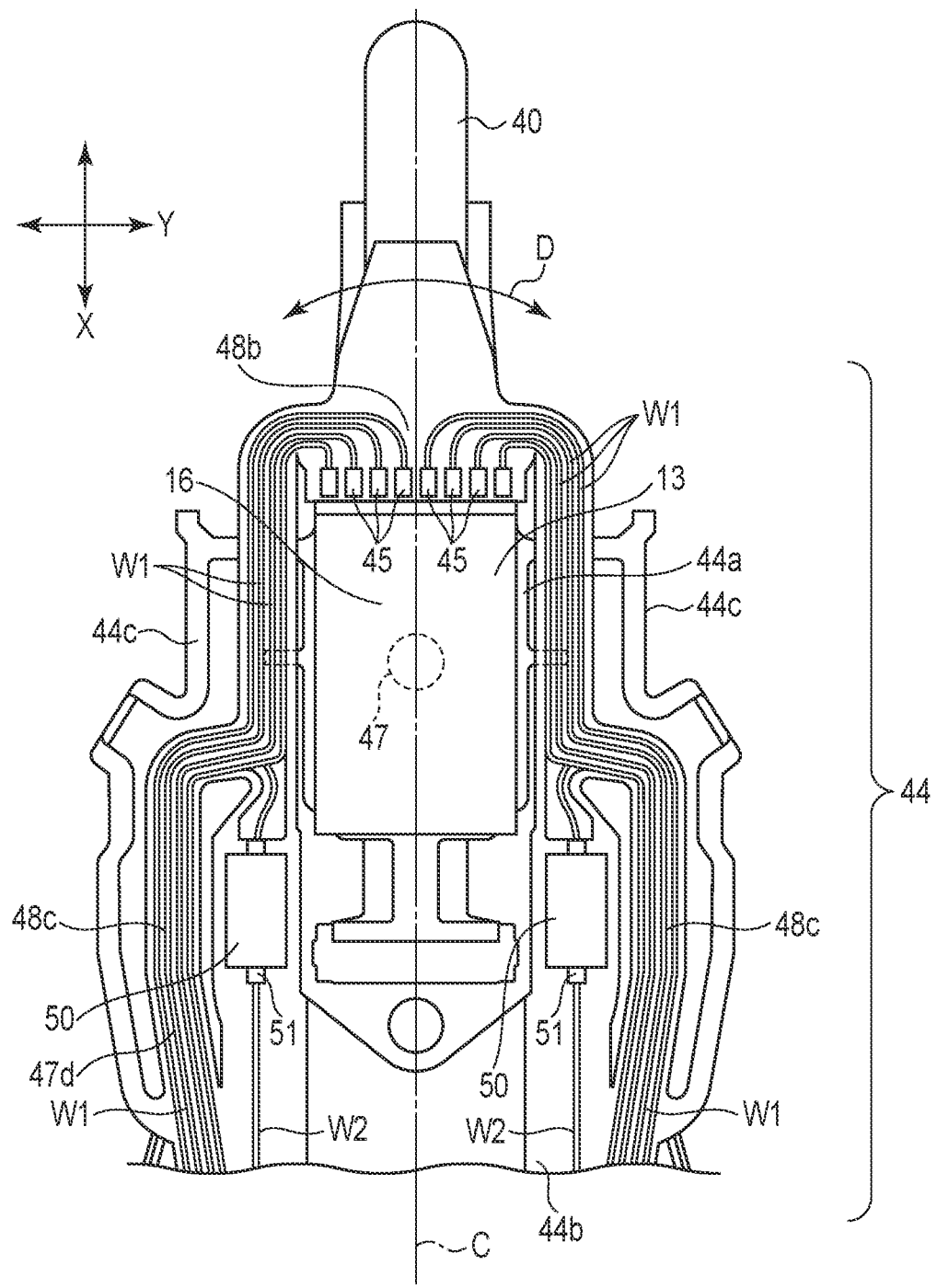
F I G. 4

DISK DEVICE

CROSS-REFERENCE TO RELATED APPLICATIONS

This application is based upon and claims the benefit of priority from Japanese Patent Application No. 2023-199960, filed Nov. 27, 2023, the entire contents of which are incorporated herein by reference.

FIELD

Embodiments described herein relate generally to a disk device.

BACKGROUND

A disk device, for example, a magnetic disk device includes a rotatable disk-shaped recording medium with a magnetic recording layer, and a magnetic head configured to perform recording and resuming of data with respect to the magnetic recording layer of the recording medium. The magnetic head is supported to be movable in a radius direction of the recording medium. In recent years, magnetic disk devices including a micro actuator configured to perform fine tuning the position of the magnetic head are proposed.

In order to improve recording density, especially, linear recording density, a gap between the magnetic head and the recording medium is required to be smaller in the magnetic disk devices. However, when the micro actuator is driven, the magnetic head moves not only in a track direction (radial direction) of the recording medium, but also slightly in a direction crossing the surface of the recording medium. Thus, a gap between the magnetic head and the recording medium varies, and a predetermined desired gap may not be maintained in some cases.

BRIEF DESCRIPTION OF THE DRAWINGS

FIG. 1 is a perspective view of a hard disk drive (HDD) of a first embodiment, illustrated in a disassembled manner in which a top cover is removed.

FIG. 4 is a plan view of a tip of the head suspension assembly.

DETAILED DESCRIPTION

Figure 2:
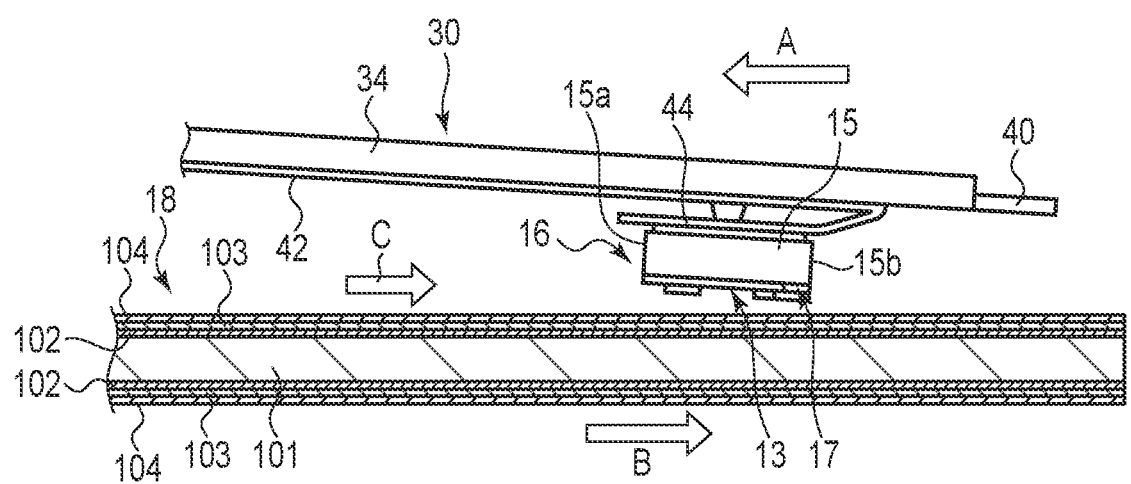
FIG. 2 is a schematic side view of a magnetic head, suspension, magnetic disk of the HDD.

Various embodiments will be described hereinafter with reference to the accompanying drawings. In general, according to one embodiment, a disk device comprises a disk-shaped recording medium; a magnetic head including a write head, a read head, and a heater configured to adjust a gap between the magnetic head and the recording medium; a suspension assembly supporting the magnetic head; a micro actuator including a piezoelectric element provided on the suspension assembly; and a controller configured to set a drive voltage of the piezoelectric element in accordance with a difference between a touchdown output in time of driving the piezoelectric element and a touchdown output in time of non-driving the piezoelectric element.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

As an example of the disk device, a hard disk drive of a first embodiment will be explained in detail. FIG. 1 is a perspective view of the HDD of the first embodiment, illustrated in a disassembled manner in which a top cover thereof is removed. FIG. 2 is a schematic block diagram of the entire structure of the HDD including a controller.

As in FIG. 1, the HDD 11 includes a rectangular body 10. The body 10 includes a rectangular box-shaped base 12 with upper surface thereof opened, and a cover (top cover) 14. The base 12 includes a rectangular bottom wall 12a and a side wall 12b standing along the peripheral edge of the bottom wall 12a, which are integrally formed of aluminum, for example. The cover 14 is formed of, for example, stainless steel in a rectangular plate. The cover 14 is screwed on the side wall 12b of the base 12 with a plurality of screws 13 to close the upper opening of the base 12 in an airtight manner.

Within the body 10, a plurality of disk-shaped recording media, for example, ten magnetic disks 18, and a spindle motor 19 which supports and rotates the magnetic disk 18 are disposed. The spindle motor 19 is disposed on the bottom wall 12a. Each magnetic disk 18 includes, for example, a substrate formed in a disk-shape of 95 mm (3.5 inch) diameter, and a magnetic recording layer formed on the upper and lower surfaces of the substrate. Each magnetic disk 18 is coaxially engaged to a hub of the spindle motor 19, and further is clamped by a clamp spring 20. Thus, the magnetic disk 18 is supported in a position parallel with the bottom wall 12a of the base 12. The multiple magnetic disks 18 are rotated in an arrow B direction at a predetermined revolution number by the spindle motor 19. Note that, the number of the mounted magnetic disks 18 is not limited to ten, and may be nine or less, or may be ten to twelve.

Within the body 10, a plurality of magnetic heads 16 which performs recording and resuming of information with respect to the magnetic disk 18, and an actuator assembly 22 movably supporting the magnetic heads 16 with respect to the magnetic disk 18 are disposed. Furthermore, within the body 10, a voice coil motor (VCM) 24 which rotates and positions the actuator assembly 22, a ramp load mechanism 25 which maintains the magnetic head 16 in an unload position apart from the magnetic disk 18, and a substrate unit (FPC unit) 21 on which electronic components such as converter connector are mounted, are disposed.

The actuator assembly 22 includes an actuator block 29 rotatably supported about a support shaft 28, a plurality of arms 32 extending from the actuator block 29, and a suspension assembly 30 extending from each arm 32. The support shaft 28 stands on the bottom wall 12a. The magnetic head 16 is supported on a tip of each suspension assembly 30.

The actuator assembly 22 includes a support frame extending from the actuator block 29 in the opposite direction of the arm 32, the support frame is not shown. Through the support frame, a voice coil 33 is supported. The voice coil 33 is positioned between a pair of yokes 37 fixed on the base 12, and with the yokes 37 and a magnet fixed to any of the yokes 37, forms the VCM 24.

The FPC unit 21 includes a substantially rectangular base 21a fixed to the bottom wall 12a, a slender band-shaped relay part 21b extending from one side edge of the base 21a, and a joint 21c continuously provided with a tip of the relay part 21b. The base 21a, relay part 21b, and joint 21c are formed of a flexible printed circuit (FPC) board. The joint 21c is attached to the actuator block 29. To the joint 21c, a head amplifier IC 80 which will be described later is mounted.

On the outer surface of the bottom wall 12a of the base 12, a printed circuit board 27 is screwed. The base 21a of the FPC unit 21 is connected to the printed circuit board 27 via a connector which is not shown. The printed circuit board 27 forms the controller of the HDD 11. The controller controls operations of the spindle motor 19 while controlling operations of the VCM 24 and the magnetic head 16 via the substrate unit 21.

FIG. 2 is a schematic side view of the magnetic head in a floating state and the magnetic disk.

As in the figure, the magnetic disk 18 is a disk-shaped substrate 101 formed of a non-magnetic substance such as glass. On each surface of the substrate 101, a base layer 102, magnetic recording layer 103, and protection film 104 are sequentially layered. The magnetic disk 18 is rotated in the arrow B direction by the spindle motor 19 at a predetermined rate.

The suspension assembly 30 includes a suspension 34, line member (flexure) 42 attached on the suspension 34, and tub 40 extending from a tip of the suspension 34. The magnetic head 16 is supported by a gimbal part 44 of the flexure 42. The magnetic head 16 is electrically connected to the head amplifier IC 80 and the FPC unit 21 via the flexure 42.

The magnetic head 16 is structured as a floating-type head. The magnetic head 16 includes a slider 15 in a substantially cuboid-shape with an inlet end 15a, outlet end (trailing end) 15b, and disk facing surface (ABS) 13, and a head 17 formed in an end of the slider 15 in the outlet end 15b side. The head 17 includes a write head element and a read head element. The magnetic head 16 is maintained in a state floating over the surface of the magnetic disk 18 by a certain degree by air current C generated between the disk surface and the slider 15 by rotation of the magnetic disk 18. The direction of air current C matches the rotation direction B of the magnetic disk 18. In accordance with the rotation of the magnetic disk 18, the magnetic head 16 runs in the direction (circumferential direction) A in the opposite of the rotation direction B, with respect to the magnetic disk 18.

Now, an example of the suspension assembly 30 will be explained in detail.

Figure 3:
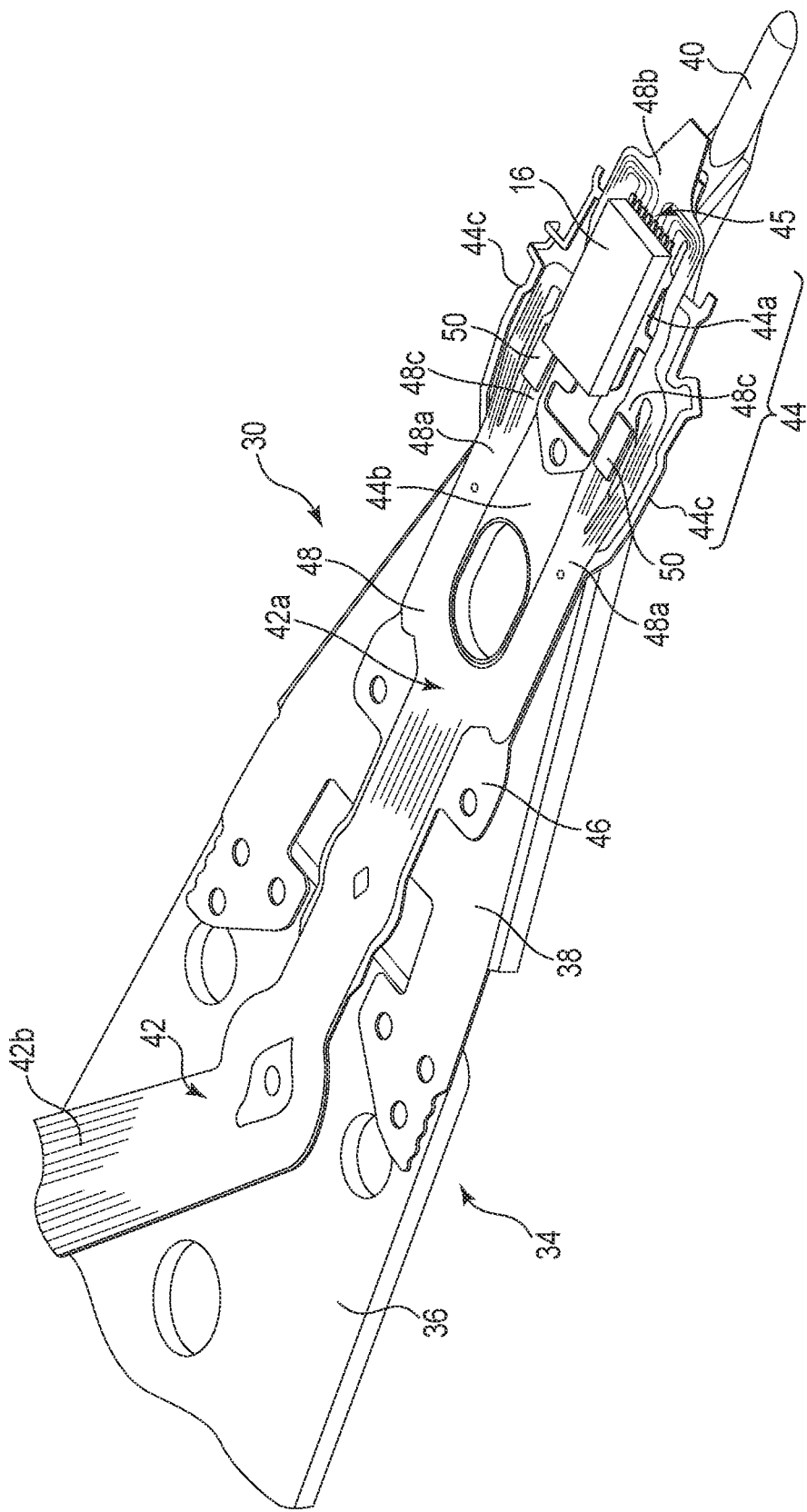
FIG. 3 is a perspective view of one head suspension assembly of an actuator assembly of the HDD.

FIG. 3 is a perspective view of one suspension assembly, and FIG. 4 is a plan view of a tip of the suspension assembly.

As in FIG. 3, each suspension assembly 30 includes a suspension 34 extending from the arm 32, and the magnetic head 16 is attached to a tip of the suspension 34. Note that, the magnetic head 16 and the suspension assembly 30 supporting the magnetic head 16 may be together referred to as a head suspension assembly.

The suspension 34 functioning as a support plate includes a rectangular base plate 36 which is a metal plate of a few hundred-micron thickness and a slender plate spring-shaped load beam 38 which is a metal plate of a few tens-micron thickness. A proximal part of the base plate 36 is fixed to a tip of the arm 32. The load beam 38 is placed such that the proximal part thereof overlaps with a tip of the base plate 36, and is fixed to the base plate 36 by welding multiple positions. A stick-like tub 40 projects from the tip of the load beam 38.

The suspension assembly 30 includes a slender band-shaped flexure (line member) 42 configured to transfer recording signals, resuming signals, and driving signals of piezoelectric element, and a pair of piezoelectric elements (for example, PZT elements) 50 mounted on the flexure 42. The flexure 42 includes a tip side part 42a arranged on the load beam 38 and the base plate 36, a proximal side part 42b extending from a side edge of the base plate 36 and extending along a side edge of the arm 32 to the actuator block 29, and a connector end which is not shown, extending from the proximal side part 42b. The connector end includes a plurality of connector pads arranged in line. The connector pads are electrically engaged to a connector terminal of the joint 21c disposed in the actuator block 29.

The tip of the flexure 42 is positioned above the tip of the load beam 38, and forms a gimbal part 44 functioning as an elastic supporting member. The magnetic head 16 is mounted on and fixed to the gimbal part 44, and is supported to the load beam 38 via the gimbal part 44. A pair of piezoelectric elements 50 as driving elements are mounted on the gimbal part 44, and arranged in the proximity of the magnetic head 1. A pair of piezoelectric elements 50 form the micro actuator.

The flexure 42 includes a metal thin plate (metal plate) 46 which is a base formed of stainless steel and a band-shaped layered member (flexible printed circuit: FPC) 48 adhered to or fixed to the metal thin plate 46, forming a slender layered plate. The layered member (FPC) 48 includes a base insulating layer (first insulating layer) large part of which is fixed to the metal thin plate 46, conductive layer (line pattern) formed on the base insulating layer while structuring a plurality of signal lines, drive line, and a plurality of connector pads, and cover insulating layer (second insulating layer) covering the conductive layer to be layered on the base insulating layer. In the tip side part 42a of the flexure 42, the metal thin plate 46 is adhered on the surface of the load beam 38 and the base plate 36, or welded on multiple points by spot welding.

As in FIGS. 3 and 4, in the gimbal part 44, the metal thin plate 46 integrally includes a substantially rectangular tongue (support) part 44a positioned in the tip side, substantially rectangular proximal part 44b positioned in the proximal side with respect to the tongue part 44a with a space therebetween, and a pair of elastically deformable outriggers (link parts) 44c connecting the proximal part 44b and the tongue part 44a.

The tongue part 44a is formed in a size and a shape which can mount the magnetic head 16, and is, for example, formed in a substantially rectangular shape. The tongue part 44a is arranged such that the center axis thereof in the width direction matches the center axis C (cf. FIG. 4) of the suspension 34.

An approximately center part of the tongue 44a contacts a dimple 47 projecting from the tip of the load beam 38. The tongue 44a can be displaced at various directions about the dimple 47 when a pair of outriggers 44c are elastically deformed. Thus, the tongue part 44a and the magnetic head 16 mounted on the tongue part 44a are displaced in a roll direction or a pitch direction flexibly following to the surface variation of the magnetic disk 18, and a micro gap can be maintained between the surface of the magnetic disk 18 and the magnetic head 16.

In the gimbal part 44, a layered member 48 of the flexure 42 is disposed on the metal plate 46 and extends from the proximal part 44b to the tongue part 44a along the center axis C1. That is, the layered member 48 includes a proximal part 48a adhered on the proximal part 44b, a tip part 48b adhered to the tongue part 44a, and a pair of band-shaped bridge parts 48c extending from the proximal part 48a to the tip part 48b in a bifurcate manner.

In the tip part 48b, a plurality of connector pads (electrode pads) 45 are arranged in a width direction. Furthermore, in the proximal part 48a, a plurality of connector pads (electrode pads) 51 to connect the piezoelectric elements 50 are disposed. The layered member 48 includes a plurality of signal lines W1 extending from the connector pads 45 around both side edges of the tip part 48b to the proximal part 48a side, and a plurality of drive lines W2 extending from the connector pads 51 to the proximal part 48a side. The signal lines W1 and the drive lines W2 extend over the entirety of the layered member 48, and are connected to a connector pad 43 of a connector end 42c.

The magnetic head 16 is fixed to the tongue part 44a with an adhesive agent. The magnetic head 16 is placed such that the central axis thereof in the longitudinal direction matches the central axis C of the suspension 34, and the approximately central part of the magnetic head 16 positioned above the dimple 47. A connector pad PT of the magnetic head 16, which will be described later is electrically connected to a plurality of connector pads 45 of the tip part 48b by soldering or a conductive adhesive agent such as silver paste. Thus, the magnetic head 16 is connected to a signal line W1 of the layered member 48 through the connector pad 45.

As in FIG. 4, a pair of piezoelectric elements 50 are, for example, rectangular thin piezoelectric elements (PZT elements). The piezoelectric element 50 is placed such that the longitudinal direction thereof (expansion/contraction direction) becomes parallel to the central axis C of the suspension 34. Two piezoelectric elements 50 are provided with both sides of the magnetic head 16 in the width direction Y and are arranged to be parallel to each other. Both ends of each piezoelectric element 50 in the longitudinal direction are mounted and electrically connected to the connector pad 51 of the proximal part 48a. Thus, the piezoelectric element 50 is connected to the drive line W2 of the layered member 48 through the connector pad 51.

The piezoelectric elements 50 may be other piezoelectric elements than the PZT elements. Furthermore, the drive elements may be other drive elements which can expand/contract by current application than the piezoelectric elements. Furthermore, the micro actuator may be structured as a single drive element instead of a pair of drive elements. Furthermore, the piezoelectric elements may be placed in the proximity of a boundary part of the base plate and the load beam instead of the proximity of the magnetic head 16, or may be placed in both the proximity of the magnetic head 16 and the proximity of the boundary part of the base plate and the load beam.

When a voltage (drive signal) is applied to the piezoelectric element 50, the piezoelectric element 50 expand/contract along the longitudinal direction thereof (direction parallel to the central axis C of the suspension). By driving two piezoelectric elements 50 to expand/contract in opposite directions, a pair of bridge parts 48c stroke in opposite directions as well. As in FIG. 4, the bridge part 48c13 rocks the tongue part 44a of the gimbal part 44 and the magnetic head 16 in an arrow D direction around the dimple 47. Through the expansion/contraction of the piezoelectric element 50 as above, the magnetic head 16 can be slightly displaced. Note that, a rocking direction D of the magnetic head 16 corresponds to a seeking direction (cross-tracking direction) of the magnetic head 16 on the magnetic disk 18.

Now, an example of the structure of the magnetic head 16 will be explained in detail.

Figure 5:
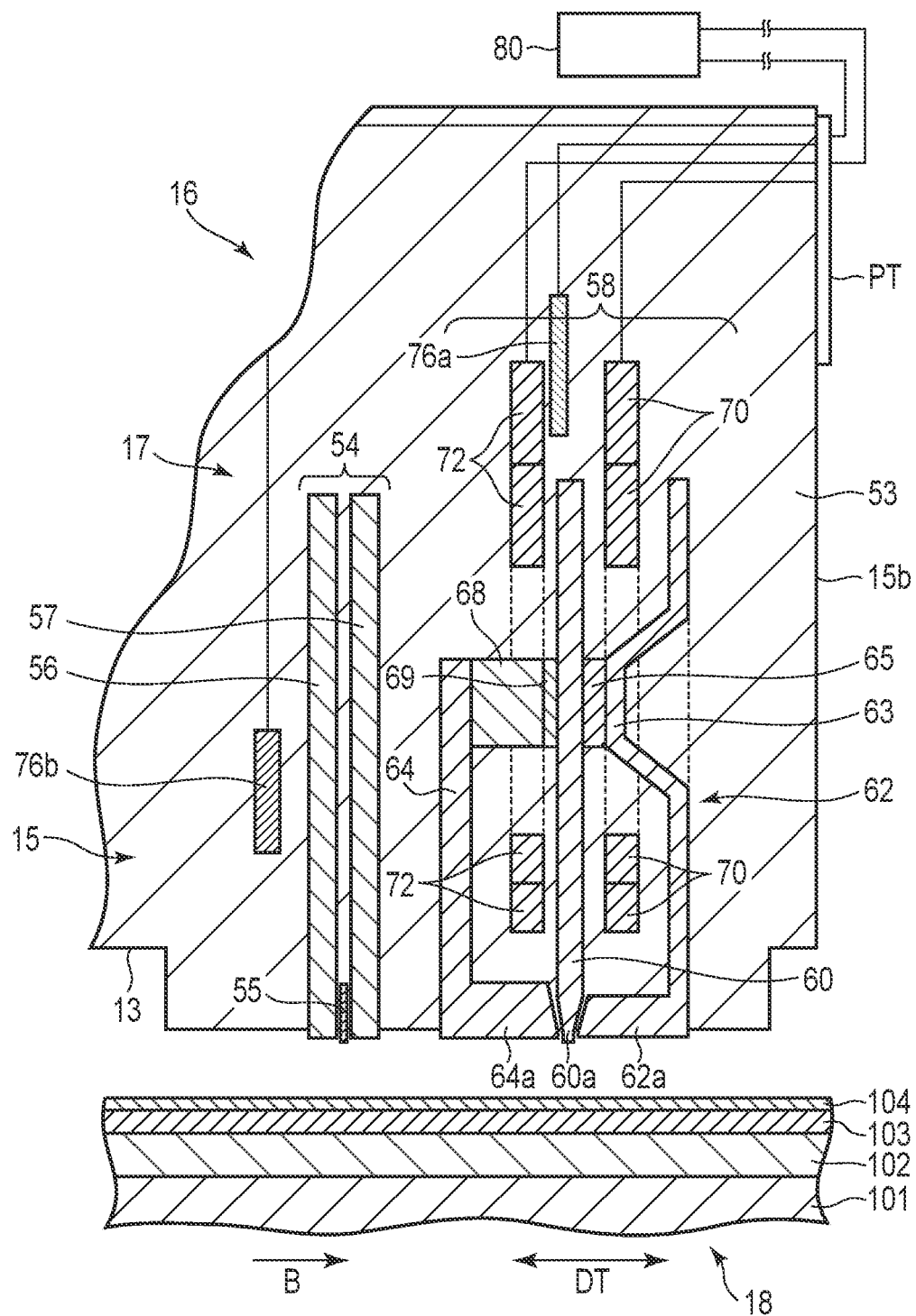
FIG. 5 is a cross-sectional view illustrating a head of the magnetic head of the HDD in an enlarged manner.

FIG. 5 is a cross-sectional view of the head 17 of the magnetic head 16 and the magnetic disk 18, illustrate in an enlarged manner.

As in FIG. 5, the head 17 of the magnetic head 16 includes a resuming head (read head) 54 and recording head (write head 58) in a trailing end 15b of the slider 15, formed in a thin-film process, and is formed as a separate-type magnetic head. The read head 54 and the write head 58 are covered with a non-magnetic protection insulating film 53 except for the part exposed to the ABS 13 of the slider 15. The protection insulating film 53 forms the exterior of the head 17. Furthermore, the head 17 includes a first head actuator which controls a projection degree of the write head 58 and a second head actuator which controls a projection degree of the read head 54. The first heat actuator includes, for example, a heater 76a, and the heater 76a is embedded in the protection insulating film 53, and is positioned in the proximity of the write head 58. The second heat actuator includes, for example, a heater 76b, and the heater 76b is embedded in the protection insulating film 53 and is positioned in the proximity of the read head 54.

A longitudinal direction of a recording track formed in the perpendicular magnetic recording layer 103 of the magnetic disk 18 will be defined as down track direction DT, and a width direction of the recording track orthogonal to the longitudinal direction will be defined as cross track direction.

The read head 54 includes a magnetic resistance effect element 55 and a first magnetic shield film 56 and a second magnetic shield film 57 arranged in a reading side (inlet side) and a trailing side (outlet side) of the magnetic resistance effect element 55, in a manner to hold the magnetic resistance effect element 55. The magnetic resistance effect element 55, and the first and second magnetic shield films 56 and 57 extend to be substantially perpendicular to the ABS 13. The lower ends (tips) of the magnetic resistance effect element 55, and the first and second magnetic shield films 54 slightly project from the ABS 13.

The write head 58 is provided with the trailing end 15*b* side of the slider 15 with respect to the read head 54. The write head 58 includes a main magnetic pole 60 which generates a recording field perpendicular to the surface of the magnetic disk 18, trailing shield 62 provided with the trailing side of the main magnetic pole 60 while being opposed to the main magnetic pole 60 with a write gap therebetween, reading shield 64 opposed thereto in the reading side of the main magnetic pole 60, and a pair of side shields which are not shown, formed integrally with the trailing shield 62. The main magnetic pole 60 and the trailing shield 62 form a first magnetic core forming a magnetic path, and the main magnetic pole 60 and the reading shield 64 form a second magnetic core forming a magnetic path. The write head 58 includes a first recording coil 70 wound around the first magnetic core, and a second recording coil 72 wound around the second magnetic core.

The main magnetic pole 60 is formed of a soft magnetic material with high permeability and high saturation magnetic flux density, and extends substantially perpendicular to the ABS 13. A tip 60*a* of the main magnetic pole 60 in the ABS 13 side is tapered to the ABS 13 to be formed in a pillar with narrower width with respect to the other components. The tip 60*a* of the main magnetic pole 60 slightly projects from the ABS 13 of the slider 15.

The trailing shield 62 is formed of a soft magnetic material, and is disposed to effectively close the magnetic path via a soft magnetic layer 102 of the magnetic disk 18 immediately below the main magnetic pole 60. The trailing shield 62 is formed in a substantially L-letter shape, and the tip 62*a* thereof is formed in a slender rectangular shape. The tip 62*a* of the trailing shield 62 slightly projects from the ABS 13 of the slider 15.

The trailing shield 62 includes a first connector 63 which is connected to the main magnetic pole 60. The first connector 63 is electrically connected to the upper part of the main magnetic pole 60 through a non-conductive substance 65, that is, a part of the main magnetic pole 60 apart from the ABS 13. The first recording coil 70 is, for example, wound around the first connector 63 in the first magnetic core. When a signal is written to the magnetic disk 18, recording current is supplied to the first recording coil 70, and thus, the first recording coil 70 excites the main magnetic pole 60 for magnetic flux flow in the main magnetic pole 60.

The reading shield 64 formed of a soft magnetic material is disposed to be opposed to the main magnetic pole 60 in the reading side of the main magnetic pole 60. The reading shield 64 is formed in a substantially L-letter shape, and the tip 64*a* in the ABS 13 side is formed in a slender rectangular shape. The tip 64*a* slightly projects from the ABS 13 of the slider 15.

Furthermore, the reading shied 64 includes a second connector 68 connected to the main magnetic pole 60 in a position apart from the ABS 13. The second connector 68 is, for example, formed of a soft magnetic material, and is electrically connected to the upper part of the main magnetic pole 60 through a non-conductive substance 69, that is, a part of the main magnetic pole 60 apart from the ABS 13. Thus, the second connector 68 and the main magnetic pole 60 and the reading shield 64 form a magnetic circuit. The second recording coil 72 of the write head 58 is, for example, wound around the second connector 68, and applies a field to the magnetic circuit.

A plurality of connector pads PT are provided with the trailing end 15*b* of the slider 15. The first recording coil 70 and the second recording coil 72 are each connected to the connector pads PT through a line, and furthermore, connected to the head amplifier IC 80 through the flexure 42. When a signal is written in the magnetic disk 18, recording current is supplied to the first recording coil 70 and the second recording coil 72, and thus, the main magnetic pole is excited for magnetic flux flow therein.

Similarly, the magnetic resistance effect element 55 of the read head 54 is connected to the connector pad PT through a line which is not shown, and furthermore, connected to the head amplifier IC 80 through the flexure 42. A signal read by the read head 54 is amplified by the head amplifier IC 80 and sent to a main controller.

The first heater 76*a* and the second heater 76*b* are each connected to the connector pad PT through a line, and furthermore, connected to the head amplifier IC 80 through the flexure 42. When drive power is applied from the head amplifier IC 80 to the first heater 76*a* and the second heater 76*b*, the heater and the proximity thereof are heated, and the write head 58 or the read head 54 can be expanded to the magnetic disk 18 side.

Figure 6:
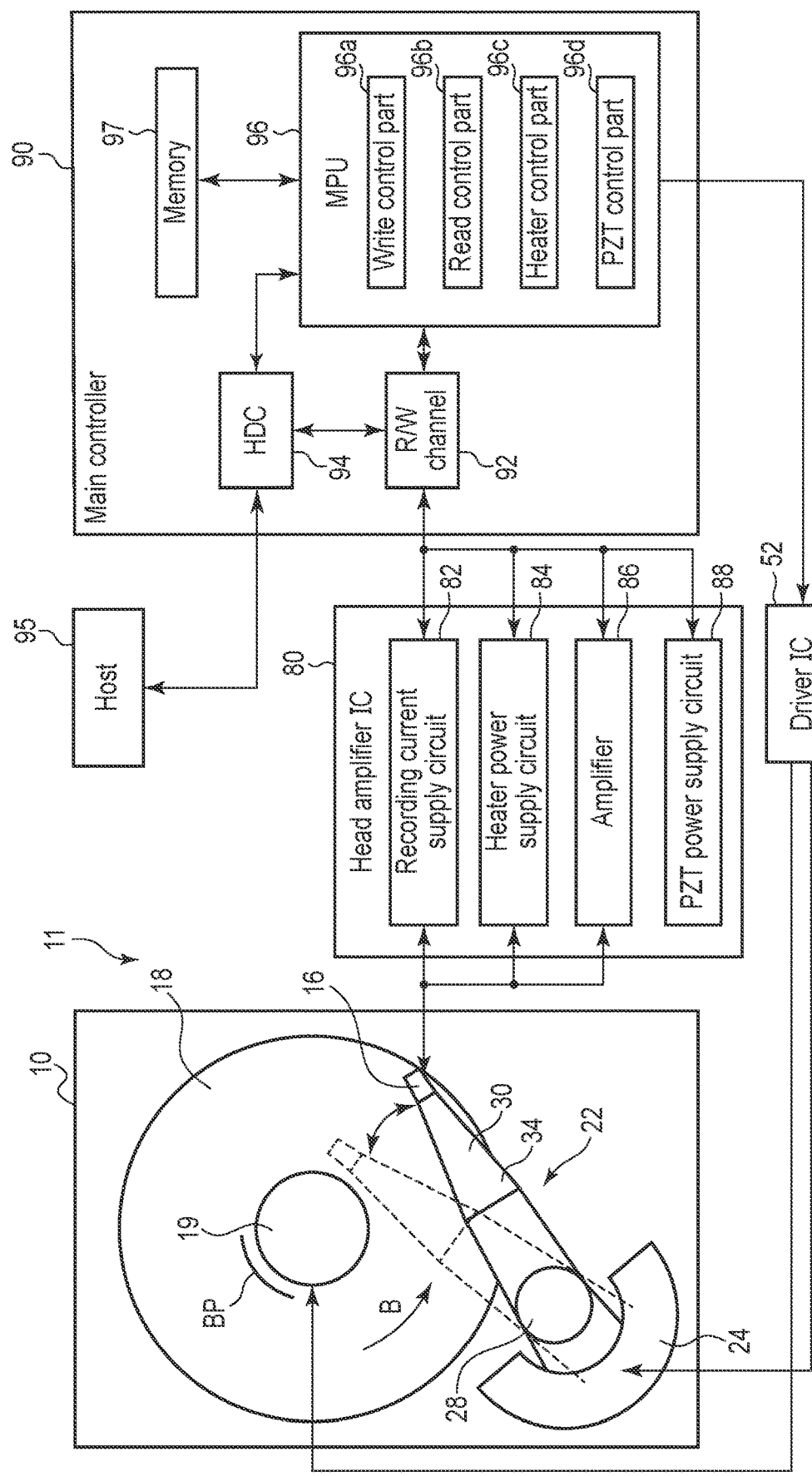
FIG. 6 is a schematic block diagram of the entire structure of the HDD including a controller.

FIG. 6 is a schematic block view of the entire structure of the HDD 11 including the main controller. As in the figure, the HDD 11 includes a controller with a head amplifier IC 80 which drives the magnetic head 16, main controller 90, and drive IC 52. The head amplifier IC 80 is provided with, for example, the actuator assembly 22, and is electrically connected to the magnetic head 16 through the flexure 42. The head amplifier IC 80 includes, for example, a recording current supply circuit (recording current supply part) 82 which supplies recording current to the recording coils 70 and 72 of the magnetic head 16, heater power supply circuit 84 which supplies drive current to a heat actuator (heaters 76*a* and 76*b*) of the magnetic head 1, amplifier 86 which amplifies a signal read by the magnetic head 16, and PZT power supply circuit 88 which supplies a drive voltage to the piezoelectric element (micro actuator) 50.

The main controller 90 and the driver IC 52 are formed in the aforementioned printed circuit board 27 disposed in the rear surface side of the body 10. The main controller 90 includes, for example, an R/W channel 92, hard disk controller (HDC) 94, microprocessor (MPU) 96, and memory 97. The main controller 90 is electrically connected to the magnetic head 16 through the head amplifier IC 80. The main controller 90 is electrically connected to the VCM 24 and the spindle motor 19 through the driver IC 52. The HDC 94 is connectable to a host computer 95.

The memory 97 of the main controller 90 stores various measured values such as heater power setting value, which will be described later. In the main controller 90, for example, an MPU 96 includes, for example, a write control part 96*a* which controls the write head, read control part 96*b* which controls the read head, heater control part 96*c* which controls power supplied to the heat actuator, and PZT control part 96*d* which controls power (voltage) supplied to the piezoelectric element 50.

Now, an operation to measure and adjust an interval (gap) between the magnetic head 16 and the surface of the magnetic disk 18 (which may be referred to as floating degree or back off (BO) degree) in the HDD 11 structured as above will be explained. The HDD 11 performs a measurement and adjustment operation of the gap at a shipping time, certain periods, or each recording operation.

Figure 7:
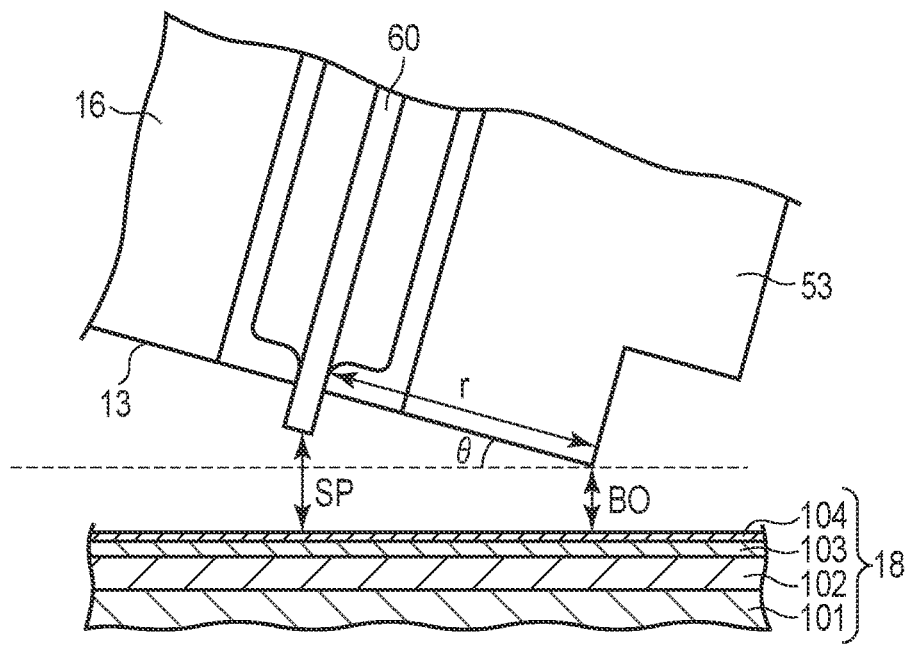
FIG. 7 is a side view of the head of the magnetic head and the magnetic disk in which a floating state of the magnetic head is schematically illustrated.

FIG. 7 is a schematic view illustrating an example of a floating state of the magnetic head 16. In the figure, BO indicates a back off degree of the magnetic head 16, and SP indicates a desired gap of the recording head 58.

θ indicates an inclination angle of the ABS 13 with respect to the surface of the magnetic disk 18, and r indicates a gap between the trailing end of the slider and the main magnetic pole 60.

In an ordinary recording operation, the main controller 90 supplies heater power of certain power value to the first heater 76a and the second heater 76b from the heater power supply circuit 84 to heat the first heater 76a and the second heater 76b. Thus, the write head 58 and the proximity thereof are heated, expanded to the surface side of the magnetic disk 18, and thus, a gap (back off degree) between the write head 58 and the disk surface is set to a predetermined value. When the supplied power value to the heater is increased, a projection degree increases, and the gap is decreased. When the supplied power value to the heater is decreased, a projection degree decreases, and the gap is increased. The heater control part 96c and the heater power supply circuit 84 control a heating degree (supplied power value) of the first and second heaters 76a and 76b such that the gap BO becomes a certain value. The magnetic head 16 executes the recording operation while the gap BO is set to a certain value.

Figure 8:
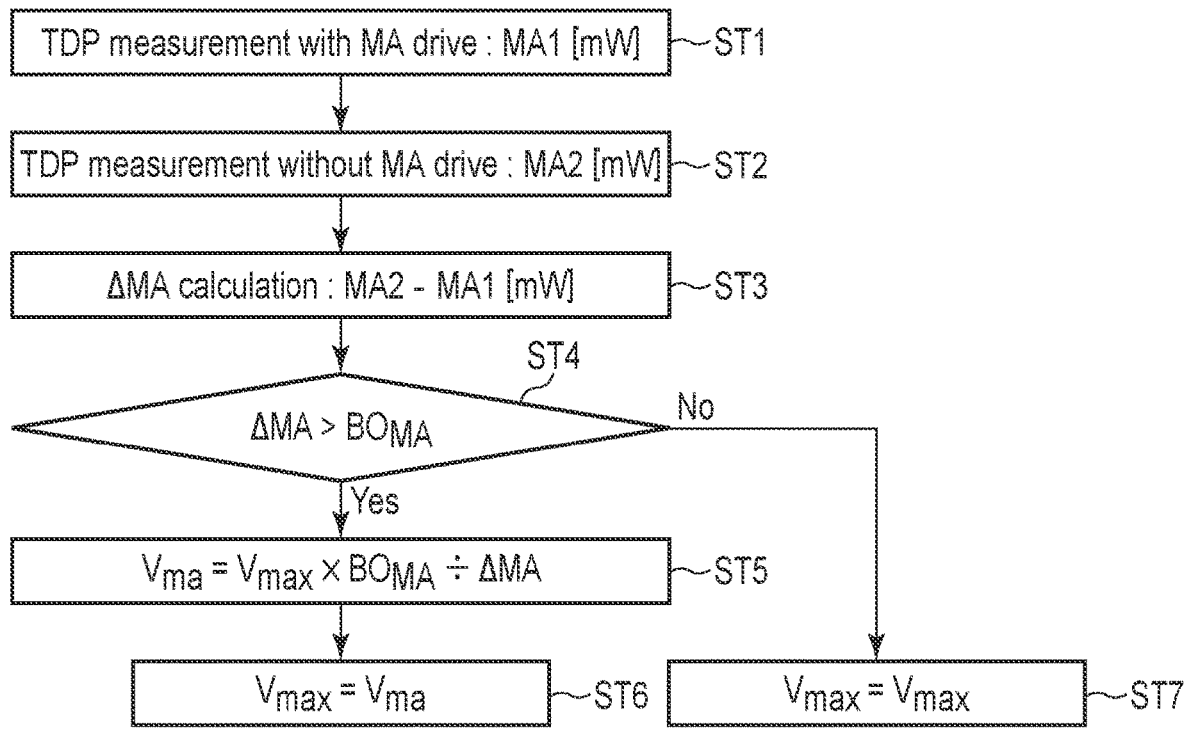
FIG. 8 is a flowchart of adjustment operation of a drive voltage of a micro actuator provided with the head suspension assembly.

FIG. 8 is a flowchart of an example of a measurement/adjustment operation.

As in the figure, for example, in the measurement/adjustment operation of the gap BP in the shipping time of HDD, initially, the main controller 90 selects an optional suspension assembly 30 and a magnetic head N (magnetic head 16) thereof. A PZT control part 96d of the main controller 90 supplies a maximum drive voltage Vmax (V) of the micro actuator to a pair of piezoelectric elements 50 of a suspension assembly 30 selected from a PZT power supply circuit 88 for expansion/contraction drive of the elements. While driving the piezoelectric elements 50, the main controller 90 supplies heater power to the first heater 76a and the second heater 76b from the heater power supply circuit 84 such that the magnetic head 16 can be expanded to the surface side of the magnetic disk 18. The main controller 90 increases a heater power value until the lower end corner of the magnetic head 16 touches (touchdown) the surface of the magnetic disk 18, measures the heater power value in the touchdown, and stores the measured value in the memory 97 as a touchdown output (TDP) MA1 (mW) (ST1).

Then, the main controller 90 decreases the heater power value to an ordinary value, returns the magnetic head 16 to an ordinary floating degree BO, and furthermore, stops power supply to the piezoelectric element 50, that is, returns the piezoelectric element 50 to a non-energized state. The main controller 90 supplies heater power to the first heater 76a and the second heater 76b from the heater power supply circuit 84 such that the magnetic head 16 expands to the surface side of the magnetic disk 18 while the piezoelectric element 50 is in a non-drive state. The main controller 90 increases the heater power value until the lower end corner of the magnetic head 16 touches (touchdown) the surface of the magnetic disk 18, measures the heater power value in the touchdown, and stores the measured value in the memory 97 as a touchdown output (TDP) MA2 (mW) (ST2).

The main controller 90 calculates a difference between the touchdown output MA1 in a micro actuator driving time and the touchdown output MA2 in a micro actuator non-driving time, that is, ΔMA=(MA2−MA1) (mW), and stores the calculated difference in the memory 97 (ST3). ΔMA corresponds to a floating degree variation when the piezoelectric element 50 is driven at the maximum drive voltage.

Generally, a floating degree (back off OB) of a magnetic head 16 will be determined based on stacking varying factors. One of the varying factors is variation of the floating degree caused by piezoelectric element drive. Here, a target value of the variation of the floating degree of the piezoelectric element drive will be defined as BOMA. If an output difference ΔMA is greater than a target value BOMA, a risk of collision of the magnetic disk 18 and the slider of the magnetic head 16 becomes high. Note that, the target value BOMA is preliminarily stored in the memory 97.

Therefore, in the present embodiment, the main controller 90 compares the calculated output difference ΔMA and the target value BOMA (ST4), and if ΔMA is greater than the target value BOMA, a ratio between BOMA and ΔMA (BOMA/ΔMA) is multiplied on the maximum drive voltage Vmax to derive a correction value Vma (ST5). The main controller 90 sets the derived correction value Vma to the maximum drive voltage Vmax of the piezoelectric element 50, which is stored in the memory 97. Furthermore, if ΔMA is smaller than the target value BOMA, the main controller 90 does not change the maximum drive voltage Vmax, which is stored in the memory 97 as a predetermined maximum drive voltage Vmax (ST7).

In the recording operation, the main controller 90 drives the piezoelectric element 50 within a range of the maximum drive voltage Vmax set as above. Thus, variation of the floating degree (BO) of the magnetic head 16 in the micro actuator (piezoelectric element) driving time is equal to or less than the target value BOMA. Thus, even when the micro actuator is driven, variation in the floating degree BO of the magnetic head 16 can be suppressed, and a risk of collision of the magnetic disk and the head slider can be decreased.

With the HDD of the first embodiment configured as above, the drive voltage of the micro actuator is adjusted in accordance with a difference between the touchdown output in the micro actuator driving time and the touchdown output in the micro actuator non-driving time, and thus, variation of the floating degree of the magnetic head in the micro actuator driving time can be suppressed to be equal to or less than a predetermined target value. As a result, a risk of collision of the magnetic disk and the head slider is decreased, and credibility of the HDD can be improved. Furthermore, the floating degree of the magnetic head 16, that is, a gap between the surface of the magnetic disk and the magnetic head 16 can be set to the minimum value, and improved recording density of the HDD can be achieved.

As can be understood from the above, according to the first embodiment, a disk device which can suppress variation of the gap between the recording medium and the head for better credibility can be presented.

For example, in the first embodiment, in the HDD with a plurality of suspension assemblies and a plurality of magnetic heads, the aforementioned measurement/adjustment of the maximum drive voltage of the micro actuator may be executed per suspension assembly.

Now, an HDD of other embodiments will be explained. In the other embodiments explained below, elements similar to those of the first embodiment will be referred to by the same reference numbers, and detailed description thereof may be omitted or simplified, and parts different from the first embodiment will be mainly explained.

Second Embodiment

Figure 9:
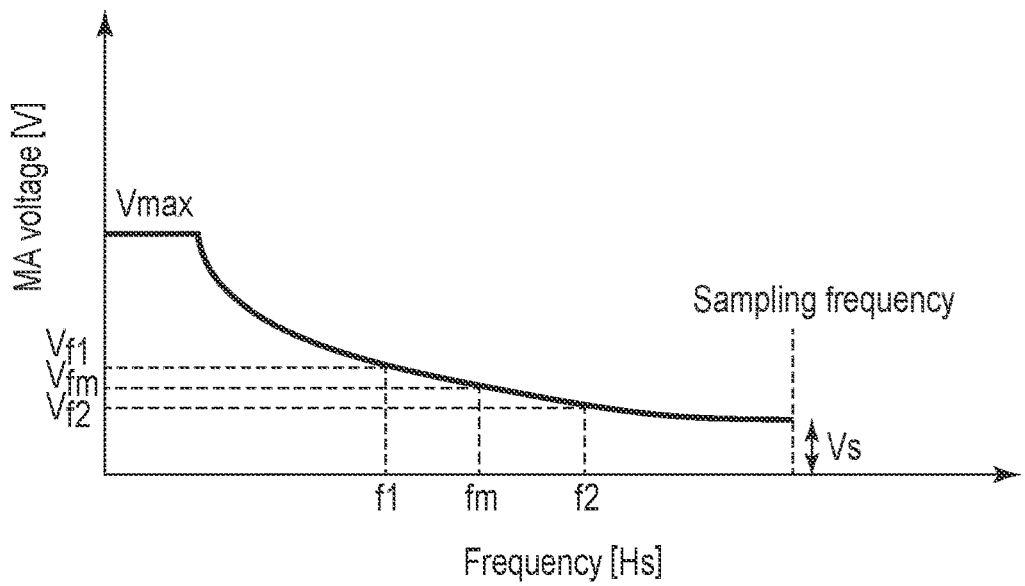
FIG. 9 is a schematic view of a relationship between the drive voltage of the micro actuator and frequency (differential voltage clip).

FIG. 9 is a schematic view of a differential voltage clip used for setting of a drive voltage of a micro actuator of an HDD of a second embodiment.

In the second embodiment, a differential voltage clip is applied to control of a drive voltage of the micro actuator (piezoelectric element 50). Note that, in the present embodiment, a differential voltage clip will be defined as suppressive control of a voltage differential per servo frame as frequency of voltage input of the piezoelectric element 50 gets higher.

As in FIG. 9, in the second embodiment, a drive voltage in sampling frequency is a set voltage of Vs. In that case, the drive voltage at the sampling frequency is limited to Vs.

Figure 10:
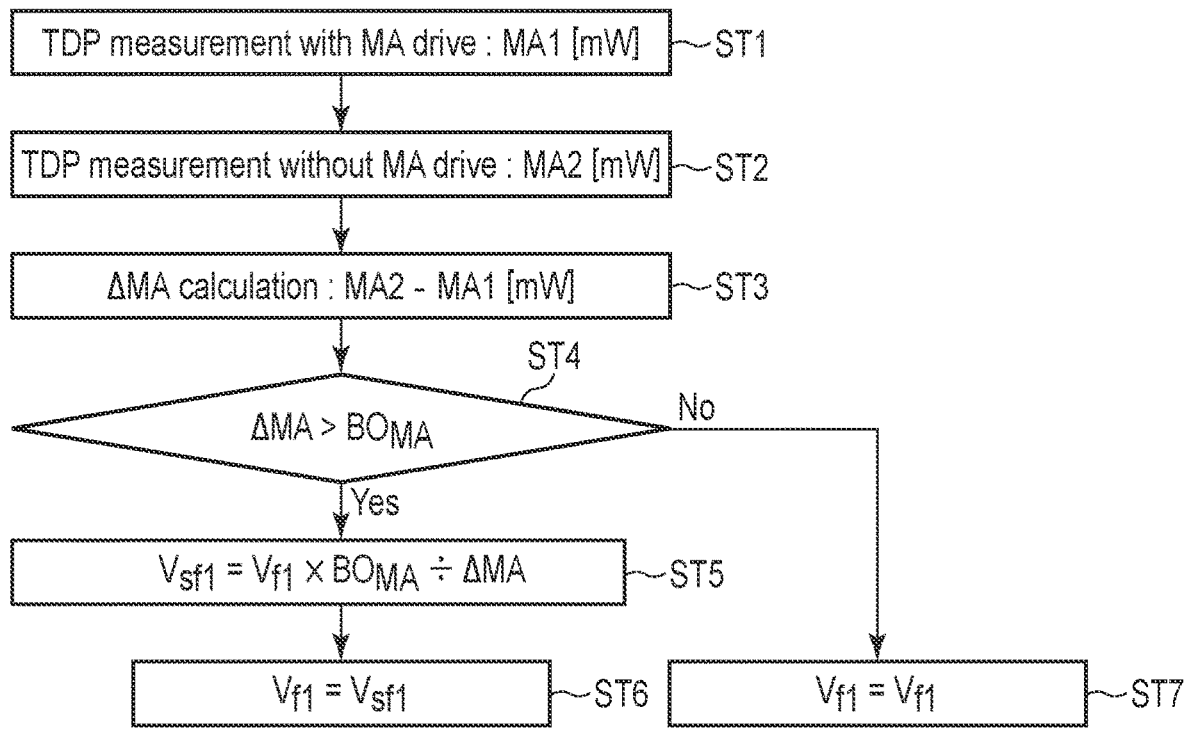
FIG. 10 is a flowchart of adjustment operation of drive voltage of a micro actuator of an HDD of a second embodiment.

FIG. 10 is a flowchart of an example of a measurement/adjustment operation of the drive voltage in the second embodiment.

As in the figure, in the second embodiment, the main controller 90 executes measurement of touchdown output MA1 in the micro actuator driving time (ST1), measurement of touchdown output MA2 in the micro actuator non-driving time (ST2), and differential ΔMA (ST3), as in the aforementioned first embodiment. Then, the main controller 90 compares the calculated output differential ΔMA and a target value BOMA (ST4), and if ΔMA is greater than the target value BOMA, given that drive voltage frequency of piezoelectric elements 50 in the touchdown time is f1, a voltage Vf1 corresponding to frequency f1 is set based on the differential voltage clip shown in FIG. 9. The main controller 90 calculates a correction value Vsf1 by multiplying a ratio of BOMA to ΔMA (BOMA/ΔMA) on the voltage Vf1 (ST5). The main controller 90 sets the obtained correction value Vsf1 to the drive voltage Vf1 in frequency f1, which is stored in a memory 97 (ST6). Furthermore, if a frequency range at the touchdown time is f1 to f2, the main controller 90 may perform a similar process as above in frequency fm which is between f1 and f2.

On the other hand, in ST4, if ΔMA is smaller than the target value BOMA, the main controller 90 does not change the drive voltage Vf1, which is stored in the memory 97 as a predetermined drive voltage Vf1 (ST7).

In the recording operation, the main controller 90 drives piezoelectric elements 50 in a range of the drive voltage Vf1 set as above. Thus, variation of a floating degree (BO) of the magnetic head 16 in the micro actuator (piezoelectric element) driving time becomes equal to or less than the target value BOMA. Thus, even when the micro actuator is driven, variation in the floating degree BO of the magnetic head 16 can be suppressed, and a risk of collision of the magnetic disk and the head slider can be decreased.

As can be understood from the above, according to the second embodiment, a disk device which can suppress variation of the gap between the recording medium and the head for better credibility can be presented.

Third Embodiment

Figure 11:
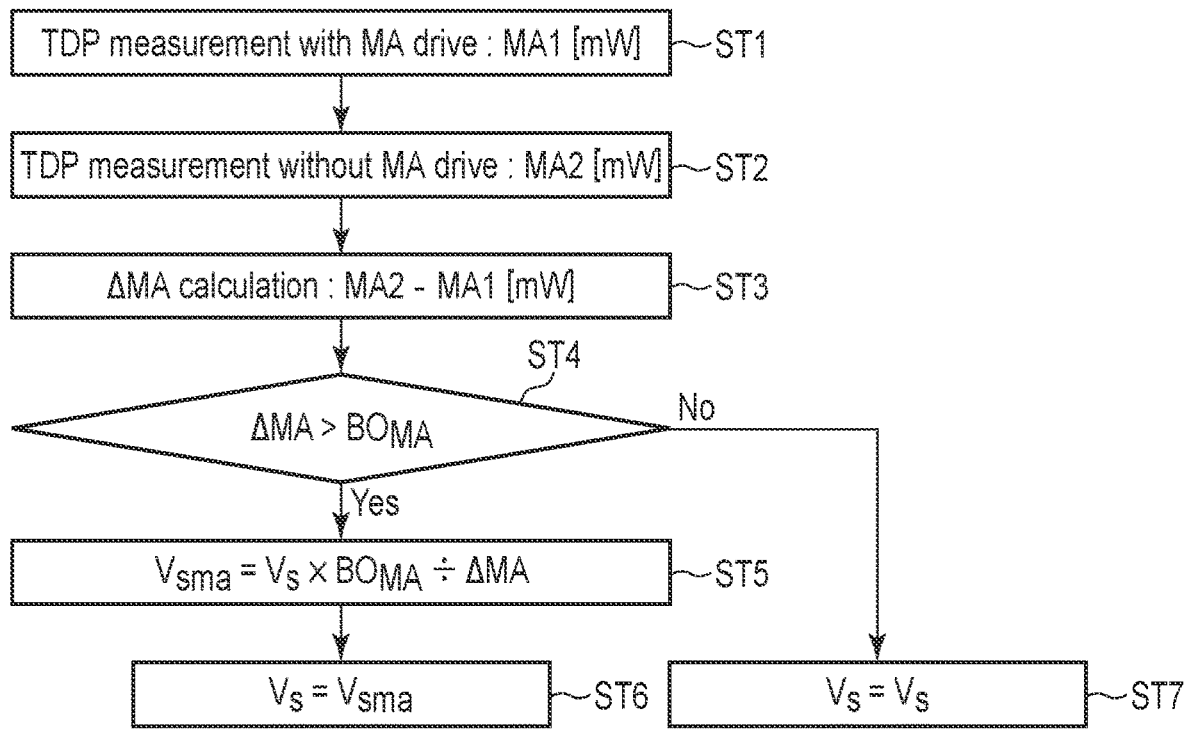
FIG. 11 is a flowchart of adjustment operation of drive voltage of a micro actuator of an HDD of a third embodiment.
Figure 12:
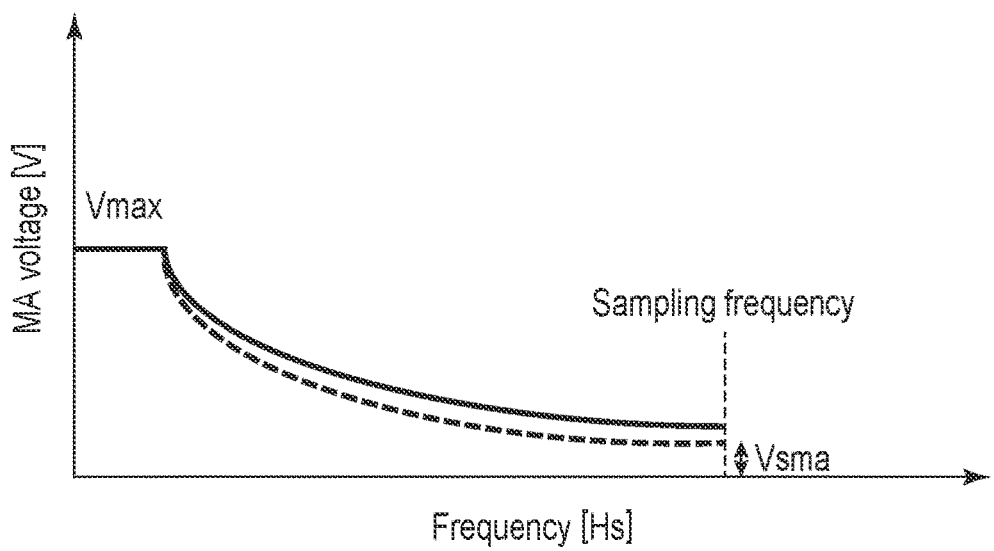
FIG. 12 is a schematic view of a relationship between the drive voltage of the micro actuator and frequency (differential voltage clip) in the third embodiment.

FIG. 11 is a flowchart of an example of a measurement/adjustment operation of the drive voltage in the third embodiment. FIG. 12 is a schematic view of a differential voltage clip used in setting of a drive voltage of a micro actuator in the third embodiment.

As in the figure, in the third embodiment, a main controller 90 executes measurement of touchdown output MA1 in the micro actuator driving time (ST1), measurement of touchdown output MA2 in the micro actuator non-driving time (ST2), and differential ΔMA (ST3), as in the aforementioned first embodiment. Then, the main controller 90 compares the calculated output differential ΔMA and a target value BOMA (ST4), and if ΔMA is greater than the target value BOMA, given that drive voltage frequency of piezoelectric elements 50 in the touchdown time is f1, a voltage Vs corresponding to drive voltage frequency of piezoelectric elements 50 at the touchdown time is set based on the differential voltage clip shown in FIG. 12. The main controller 90 calculates a correction value Vsma by multiplying a ratio of BOMA to ΔMA (BOMA/ΔMA) on the voltage Vs (ST5). The main controller 90 sets the obtained correction value Vsma to the set voltage Vs of the differential voltage clip in sampling frequency, which is stored in a memory 97 (ST6).

On the other hand, in ST4, if ΔMA is smaller than the target value BOMA, the main controller 90 does not change the drive voltage Vs, which is stored in the memory 97 as a set value Vs of drive voltage (ST7).

In the recording operation, the main controller 90 drives piezoelectric elements 50 in a range of the drive voltage Vs set as above. In that case, as depicted by a broken line in FIG. 12, frequency characteristics of a differential voltage clip is suppressed in accordance with the correction value Vsma, and thus, variation of a floating degree (BO) of the magnetic head 16 in the micro actuator (piezoelectric element) driving time becomes equal to or less than the target value BOMA. Thus, even when the micro actuator is driven, variation in the floating degree BO of the magnetic head 16 can be suppressed, and a risk of collision of the magnetic disk and the head slider can be decreased.

As can be understood from the above, according to the third embodiment, a disk device which can suppress variation of the gap between the recording medium and the head for better credibility can be presented.

Note that, in both the second and third embodiments, in the HDD with a plurality of suspension assemblies and a plurality of magnetic heads, the aforementioned measurement/adjustment of the maximum drive voltage of the micro actuator may be executed per suspension assembly (magnetic head). By setting a drive voltage per magnetic head, even if there is spacing variation in individual head, the variation can be set below a certain value, and thus, more accurate back off controlling can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, materials, shapes, sizes of elements structuring a head of a magnetic head can be changed as need be. In a magnetic disk device, the number of magnetic disks and magnetic heads can be increased/decreased as need be, and sizes of the magnetic disks can be selected optionally.

What is claimed is:

1. A disk device comprising:
   a disk-shaped recording medium;
   a magnetic head including a write head, a read head, and a heater configured to adjust a gap between the magnetic head and the recording medium;
   a suspension assembly supporting the magnetic head;
   a micro actuator including a piezoelectric element provided on the suspension assembly and configured to expand/contract to displace the magnetic head in a seeking direction when a drive voltage is applied to the piezoelectric element; and a controller configured to set a drive voltage of the piezoelectric element in accordance with a difference between a touchdown output in time of driving the piezoelectric element and a touchdown output in time of non-driving the piezoelectric element.

2. The disk device of claim 1, wherein given that the touchdown output in time of driving the piezoelectric element is MA1, the touchdown output in time of non-driving the piezoelectric element is MA2, the difference is ΔMA, a target value of variation of the gap is BOMA, and a maximum drive voltage of the piezoelectric element is VMax, if the difference ΔMA is greater than the target value BOMA, the controller calculates a correction value Vma by multiplying the maximum drive voltage VMax with a ratio of the BOMA to the ΔMA, and sets the calculated correction value Vma as a maximum drive voltage VMax of the piezoelectric element.

3. The disk device of claim 1, further comprising a plurality of suspension assemblies including the magnetic head and the piezoelectric element, wherein the controller sets, as to each suspension assembly, a drive voltage of the piezoelectric element in accordance with a difference between a touchdown output in time of driving the piezoelectric element and a touchdown output in time of non-driving the piezoelectric element.

4. A disk device comprising:

a disk-shaped recording medium;

a magnetic head including a write head, a read head, and a heater configured to adjust a gap between the magnetic head and the recording medium;

a suspension assembly supporting the magnetic head;

a micro actuator including a piezoelectric element provided on the suspension assembly and configured to expand/contract to displace the magnetic head in a seeking direction when a drive voltage is applied to the piezoelectric element; and a controller configured to set a differential voltage clip of the piezoelectric element by which a variation of the gap by drive of the piezoelectric element becomes a target value or less, in accordance with a difference between a touchdown output in time of driving the piezoelectric element and a touchdown output in time of non-driving the piezoelectric element.

5. The disk device of claim 4, further comprising a plurality of suspension assemblies including the magnetic head and the piezoelectric element, wherein the controller sets, as to each suspension assembly, a differential voltage clip of the piezoelectric element by which a variation of the gap by drive of the piezoelectric element becomes a target value or less, in accordance with a difference between a touchdown output in time of driving the piezoelectric element and a touchdown output in time of non-driving the piezoelectric element in a non-drive time.

6. A disk device comprising:

a disk-shaped recording medium;

a magnetic head including a write head, a read head, and a heater configured to adjust a gap between the magnetic head and the recording medium;

a suspension assembly supporting the magnetic head;

a micro actuator including a piezoelectric element provided on the suspension assembly; and a controller configured to set a drive voltage of the piezoelectric element in accordance with a difference between a touchdown output in time of driving the piezoelectric element and a touchdown output in time of non-driving the piezoelectric element; wherein given that the touchdown output in time of driving the piezoelectric element is MA1, the touchdown output in time of non-driving the piezoelectric element is MA2, the difference is ΔMA, a target value of variation of the gap is BOMA, and a maximum drive voltage of the piezoelectric element is VMax, if the difference ΔMA is greater than the target value BOMA, the controller calculates a correction value Vma by multiplying the maximum drive voltage VMax with a ratio of the BOMA to the ΔMA, and sets the calculated correction value Vma as a maximum drive voltage VMax of the piezoelectric element.

7. A disk device comprising:

a disk-shaped recording medium;

a magnetic head including a write head, a read head, and a heater configured to adjust a gap between the magnetic head and the recording medium;

a plurality of suspension assemblies each including the magnetic head and a micro actuator including a piezoelectric element provided on the suspension assembly; and a controller configured to set a drive voltage of the piezoelectric element in accordance with a difference between a touchdown output in time of driving the piezoelectric element and a touchdown output in time of non-driving the piezoelectric element; wherein the controller sets, as to each suspension assembly, a drive voltage of the piezoelectric element in accordance with a difference between a touchdown output in time of driving the piezoelectric element and a touchdown output in time of non-driving the piezoelectric element.

* * * * *